US008966891B2

(12) United States Patent
Opdenbosch

(10) Patent No.: US 8,966,891 B2
(45) Date of Patent: Mar. 3, 2015

(54) METERLESS HYDRAULIC SYSTEM HAVING PUMP PROTECTION

(75) Inventor: Patrick Opdenbosch, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 824 days.

(21) Appl. No.: 13/250,171

(22) Filed: Sep. 30, 2011

(65) Prior Publication Data

US 2013/0081384 A1 Apr. 4, 2013

(51) Int. Cl.
*F16D 31/02* (2006.01)
*E02F 9/22* (2006.01)
*F15B 11/16* (2006.01)

(52) U.S. Cl.
CPC ............... *E02F 9/2228* (2013.01); *F15B 11/16* (2013.01); *E02F 9/2289* (2013.01); *E02F 9/2296* (2013.01); *F15B 2211/20546* (2013.01); *F15B 2211/20561* (2013.01); *F15B 2211/20569* (2013.01); *F15B 2211/255* (2013.01); *F15B 2211/27* (2013.01); *F15B 2211/30505* (2013.01); *F15B 2211/30515* (2013.01); *F15B 2211/30565* (2013.01); *F15B 2211/6346* (2013.01); *F15B 2211/6652* (2013.01); *F15B 2211/6654* (2013.01)
USPC .................................. 60/468; 60/476; 60/461

(58) Field of Classification Search
USPC .................... 60/461, 468, 473, 474, 476, 494
See application file for complete search history.

(56) References Cited

U.S. PATENT DOCUMENTS 4,369,625 A 1/1983 Izumi et al.
4,449,366 A 5/1984 Sato et al.
4,561,249 A 12/1985 Watanabe et al.
4,586,330 A 5/1986 Watanabe et al.
4,768,339 A 9/1988 Aoyagi et al.
4,833,798 A 5/1989 Ehrich (Continued)

FOREIGN PATENT DOCUMENTS

EP 0908413 A2 4/1999
EP 1 598 561 11/2005

(Continued)

OTHER PUBLICATIONS

Zick, J., entitled “Verbesserte Leistungsausnutzung bei Erdbaumaschinen durch optimal Pumpensteuerung”, Olhydraulic und pneumatic 20 (1976) Nr. 4.

(Continued)

*Primary Examiner* — Michael Leslie
(74) *Attorney, Agent, or Firm* — Finnegan, Henderson, Farabow, Garrett & Dunner, LLP

(57) ABSTRACT

A hydraulic system is disclosed. The hydraulic system may have an over-center, variable-displacement pump, an actuator, and first and second passages that create a closed-loop circuit. The hydraulic system may also have first and second check valves disposed in the first and second passages, respectively, to allow flow only from the pump to the actuator. The hydraulic system may further have a first bypass line connecting the first passage at a location between the actuator and the first check valve to the first passage at a location between the first check valve and the pump, and a second bypass line connecting the second passage at a location between the actuator and the second check valve to the second passage at a location between the second check valve and the pump. The hydraulic system may additionally have a valve configured to control flow through the first and second bypass lines.

20 Claims, 2 Drawing Sheets

(56) References Cited

U.S. PATENT DOCUMENTS

| | | | |
|---|---|---|---|
| 4,955,283 | A | 9/1990 | Hidaka et al. |
| 5,048,293 | A | 9/1991 | Aoyagi |
| 5,329,767 | A | 7/1994 | Hewett |
| 6,330,797 | B1 | 12/2001 | Kondo |
| 6,745,992 | B2 | 6/2004 | Yang et al. |
| 6,789,335 | B1 | 9/2004 | Kinugawa et al. |
| 6,918,247 | B1 | 7/2005 | Warner |
| 7,243,591 | B2 | 7/2007 | Dixen et al. |
| 7,260,931 | B2 | 8/2007 | Egelja et al. |
| 7,269,944 | B2 | 9/2007 | Zhang et al. |
| 7,272,928 | B2 | 9/2007 | Ariga et al. |
| 7,412,827 | B2 | 8/2008 | Verkuilen |
| 7,434,391 | B2 | 10/2008 | Asam et al. |
| 7,490,421 | B1 | 2/2009 | Pletzer et al. |
| 7,516,613 | B2 | 4/2009 | Kadlicko |
| 2004/0083629 | A1 | 5/2004 | Kondou |
| 2004/0123499 | A1 | 7/2004 | Arii |
| 2005/0012337 | A1 | 1/2005 | Yoshimatsu |
| 2005/0036894 | A1 | 2/2005 | Oguri |
| 2007/0044463 | A1 | 3/2007 | VerKuilen et al. |
| 2008/0250783 | A1 | 10/2008 | Griswold |
| 2008/0300757 | A1 | 12/2008 | Kanayama et al. |
| 2008/0314038 | A1 | 12/2008 | Tozawa et al. |
| 2009/0165450 | A1 | 7/2009 | Cherney et al. |
| 2009/0288408 | A1 | 11/2009 | Tozawa et al. |
| 2010/0000209 | A1 | 1/2010 | Wada et al. |
| 2010/0000211 | A1 | 1/2010 | Ikeda et al. |
| 2010/0043420 | A1 | 2/2010 | Ikeda et al. |
| 2010/0107620 | A1 | 5/2010 | Nelson et al. |
| 2010/0115936 | A1 | 5/2010 | Williamson et al. |
| 2010/0162593 | A1 | 7/2010 | Hughes, IV et al. |
| 2010/0162885 | A1 | 7/2010 | Hughes, IV et al. |
| 2010/0163258 | A1 | 7/2010 | Hughes, IV et al. |
| 2010/0218493 | A1 | 9/2010 | Nakamura et al. |
| 2011/0029206 | A1 | 2/2011 | Kang et al. |
| 2011/0030364 | A1 | 2/2011 | Persson et al. |

FOREIGN PATENT DOCUMENTS

| | | |
|---|---|---|
| GB | 2 269 425 | 2/1994 |
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 10-96402 | 4/1998 |
| JP | 2001-012418 A | 1/2001 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Linjama, M. (2011) entitled "Digital Fluid Power-State of the Art", The 12$^{th}$ Scandinavian International Conference on Fluid Power, May 18-20, 2011 Tampere, Finland.

Zimmerman, J. PhD Student/Purdue University, Center for Compact and Efficient Fluid Power PowerPoint Presentation, Annual Meeting (Jun. 14).

Zimmerman, J. et al., "Hybrid Displacement Controlled Multi-Actuator Hydraulic Systems", The Twelfth Scandinavian International Conference on Fluid Power , Tampere, Finland (May 18-20, 2011).

Brezonick, M., "The Potential of Pump-Controlled Hydraulics", Hydraulic Horizons, Diesel Progress North American Edition (Jan. 2009).

METERLESS HYDRAULIC SYSTEM HAVING PUMP PROTECTION

TECHNICAL FIELD

The present disclosure relates generally to a hydraulic system and, more particularly, to a meterless hydraulic system having pump protection.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in flow losses that reduce an overall efficiency of a hydraulic system.

An alternative type of hydraulic system is known as a meterless hydraulic system. A meterless hydraulic system generally includes a pump connected in closed-loop fashion to a single actuator or to a pair of actuators operating in tandem. During operation, the pump draws fluid from one chamber of the actuator(s) and immediately discharges pressurized fluid back into an opposing chamber of the same actuator(s). To move the actuator(s) at a higher speed, the pump discharges fluid at a faster rate. To move the actuator with a lower speed, the pump discharges the fluid at a slower rate. A meterless hydraulic system is generally more efficient than a conventional hydraulic system because the speed of the actuator(s) is controlled through pump operation as opposed to fluid restriction. That is, the pump is controlled to only discharge as much fluid as is necessary to move the actuator (s) at a desired speed, and no throttling of a fluid flow is required.

An exemplary meterless hydraulic system is disclosed in U.S. Pat. No. 4,369,625 of Izumi et al. that issued on Jan. 25, 1983 (the ’625 patent). The ’625 patent describes a multi-actuator meterless-type hydraulic system, wherein each actuator is paired with a pump in a closed-loop manner. As described above, a speed and rotational direction of each actuator is controlled by controlling a displacement angle of its paired pump.

Although an improvement over open-loop hydraulic systems, the closed-loop hydraulic system of the ’625 patent described above may still be less than optimal. In particular, the system of the ’625 patent may be prone to pump failure caused by shock-loading from the actuators. That is, during operation, each actuator can induce pressure spikes within the associated circuit when loading on the actuator suddenly changes. If these pressure spikes are allowed to travel in reverse direction through a discharge passage back to the paired pump, the spikes can create damaging loads on the pump. The system of the ’625 patent does not provide protection against shock loading.

The hydraulic system of the present disclosure is directed toward solving one or more of the problems set forth above and/or other problems of the prior art.

SUMMARY

In one aspect, the present disclosure is directed to a hydraulic system. The hydraulic system may include a pump having variable displacement and over-center functionality, an actuator, and first and second passages extending between the pump and the actuator to create a closed-loop circuit. The hydraulic system may also include a first check valve disposed within the first passage to allow fluid flow only from the pump to the actuator, and a second check valve disposed within the second passage to allow fluid flow only from the pump to the actuator. The hydraulic system may further include a first bypass line connecting the first passage at a location between the actuator and the first check valve to the first passage at a location between the first check valve and the pump, and a second bypass line connecting the second passage at a location between the actuator and the second check valve to the second passage at a location between the second check valve and the pump. The hydraulic system may additionally include a valve configured to control fluid flow through the first and second bypass lines.

In another aspect, the present disclosure is directed to a method of operating a hydraulic system. The method may include pressurizing fluid with a pump, and directing the fluid to an actuator in two different directions via a closed-loop circuit formed by a first passage and a second passage. The method may further include preventing return flow from the actuator to the pump via a first check valve in the first passage, and preventing return flow from the actuator to the pump via a check valve in the second passage. The method may also include selectively allowing return flow from the actuator to bypass the first or second check valves.

DETAILED DESCRIPTION

Figure 1:
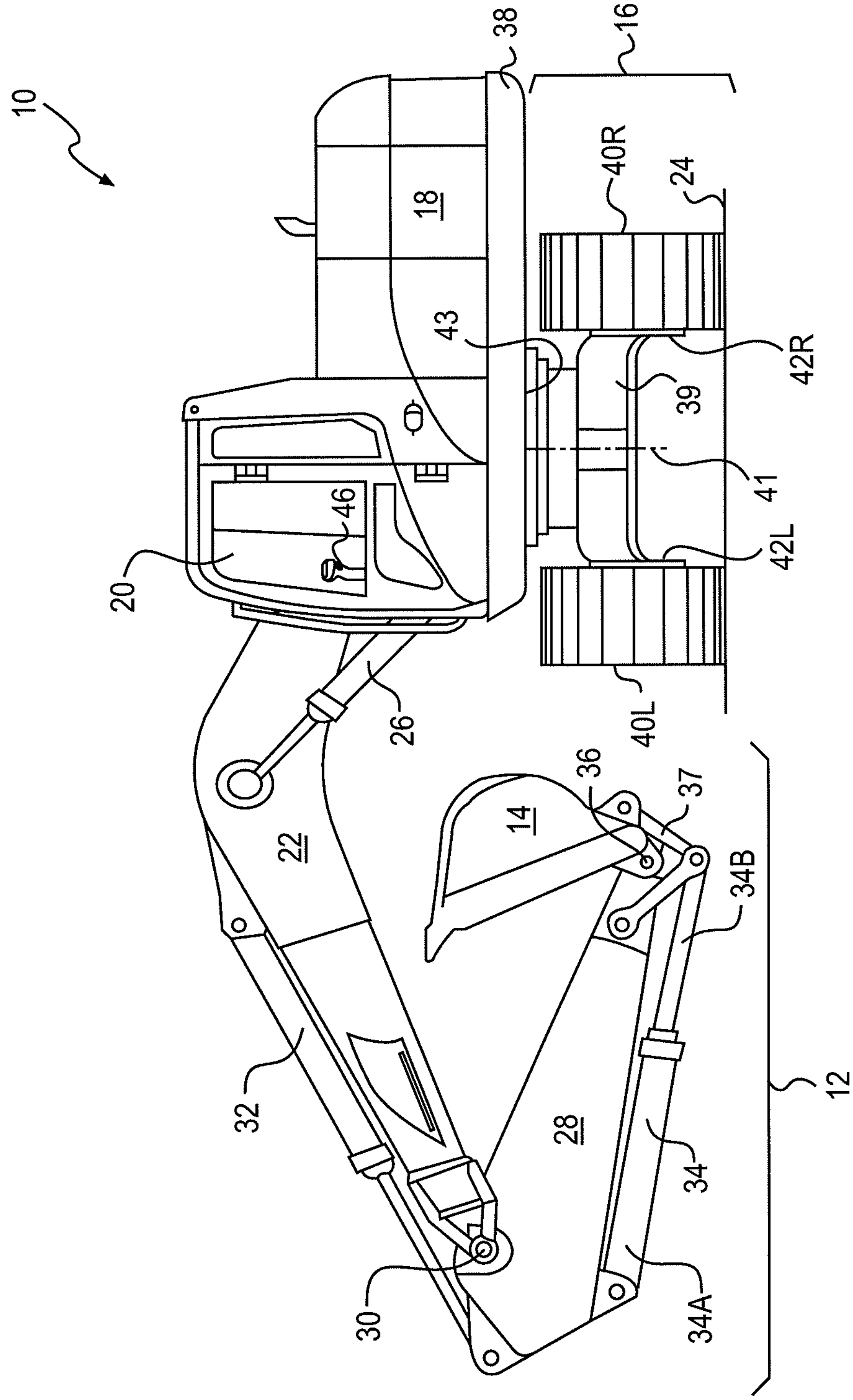
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or another earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by linear and rotary fluid actuators to move work tool 14. For example, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected at a base end to a body 38 of machine 10. Body 38 may be connected to an undercarriage 39 to swing about a vertical axis 41 by a hydraulic swing motor 43. Stick 28 may pivotally connect a distal end of boom 22 to work tool 14 by way of axes 30 and 36.

Numerous different work tools 14 may be attachable to a single machine 10 and operator controllable. Work tool 14 may include any device used to perform a particular task such as, for example, a bucket (shown in FIG. 1), a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction about pivot axis 41, work tool 14 may alternatively or additionally rotate relative to stick 28, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks, such as wheels, belts, or other known traction devices. Machine 10 may be steered by generating a speed and/or rotational direction difference between left and right travel motors 42L, 42R, while straight travel may be facilitated by generating substantially equal output speeds and rotational directions of left and right travel motors 42L, 42R.

Power source 18 may embody an engine such as, for example, a diesel engine, a gasoline engine, a gaseous fuel-powered engine, or another type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving the linear and rotary actuators of implement system 12.

Operator station 20 may include devices that receive input from a machine operator indicative of desired maneuvering. Specifically, operator station 20 may include one or more operator interface devices 46, for example a joystick (shown in FIG. 1), a steering wheel, or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
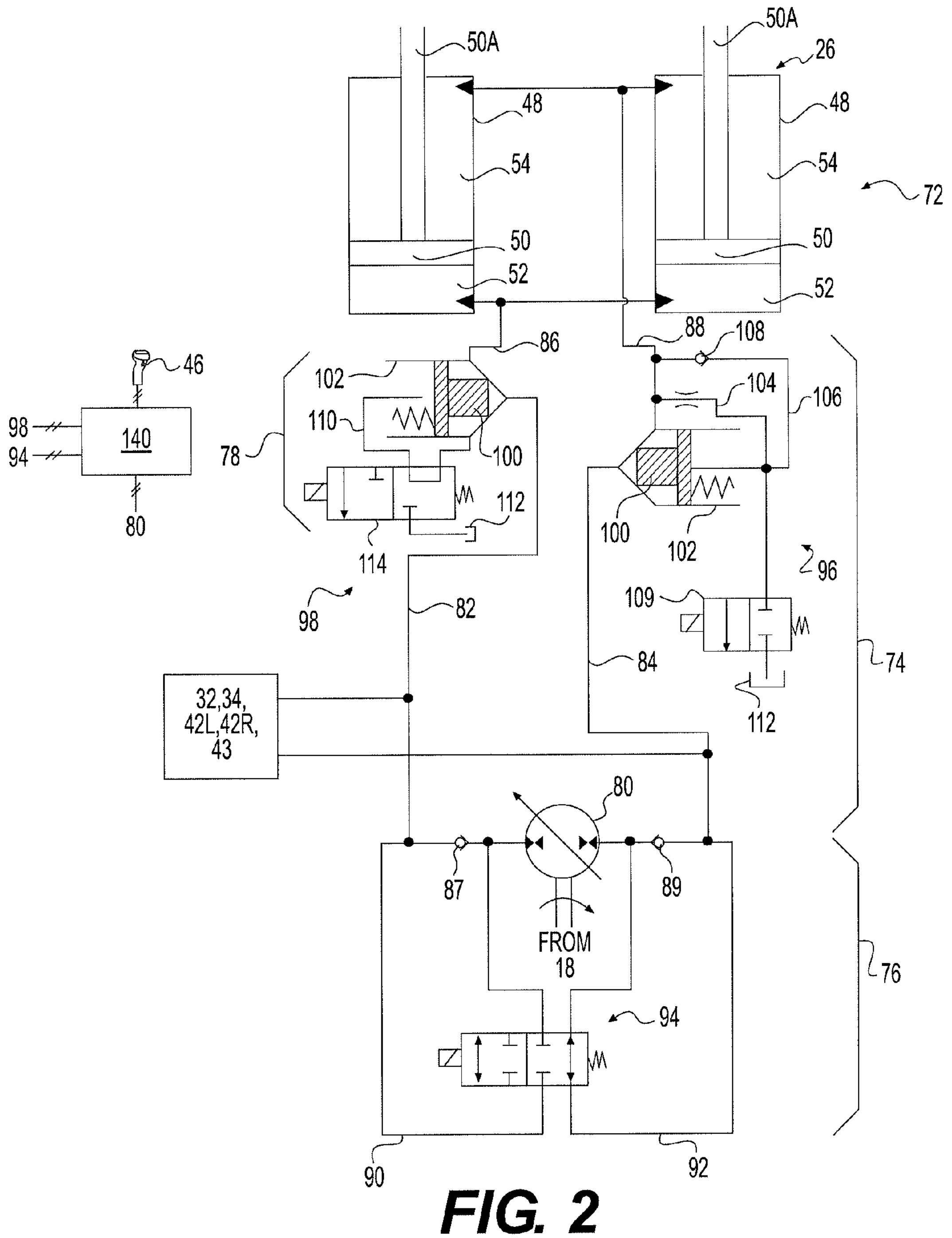
FIG. 2 is a schematic illustration of an exemplary disclosed hydraulic system that may be used in conjunction with the machine of FIG. 1.

As shown in FIG. 2, each hydraulic cylinder 26 may include a tube 48 and a piston assembly 50 arranged within tube 48 to form a first chamber 52 and an opposing second chamber 54. In one example, a rod portion 50A of piston assembly 50 may extend through an end of second chamber 54. As such, each second chamber 54 may be considered the rod-end chamber of the respective hydraulic cylinder 26, while each first chamber 52 may be considered the head-end chamber.

First chambers 52 and second chambers 54 of each hydraulic cylinder 26 may be selectively supplied with pressurized fluid from a pump 80 in parallel with each other, respectively, and drained of the pressurized fluid in parallel to cause piston assembly 50 to displace within tube 48, thereby changing the effective lengths of hydraulic cylinders 26 in tandem to move boom 22 (e.g., to raise and lower boom 22) relative to body 38 (referring to FIG. 1). A flow rate of fluid into and out of first and second chambers 52, 54 may relate to a translational velocity of hydraulic cylinders 26, while a pressure differential between first and second chambers 52, 54 may relate to a force imparted by hydraulic cylinders 26 on boom 22.

Although not shown in detail, it is contemplated that one or more of hydraulic cylinder 32, hydraulic cylinder 34, left travel motor 42L, right travel motor 42R, and/or swing motor 43, may also be connected to pump 80 in parallel with hydraulic cylinders 26, if desired. Hydraulic cylinders 32, 34 may each embody linear actuators having a composition similar to hydraulic cylinders 26 described above. Left travel motor 42L, right travel motor 42R, and swing motor 43, however, may embody rotary actuators. Each rotary actuator, like hydraulic cylinders 26, may include first and second chambers located to either side of a pumping mechanism such as an impeller, plunger, or series of pistons. When the first chamber is filled with pressurized fluid from pump 80 and the second chamber is simultaneously drained of fluid, the pumping mechanism may be urged to rotate in a first direction by a pressure differential across the pumping mechanism. Conversely, when the first chamber is drained of fluid and the second chamber is simultaneously filled with pressurized fluid, the pumping mechanism may be urged to rotate in an opposite direction by the pressure differential. The flow rate of fluid into and out of the first and second chambers may determine a rotational velocity of the rotary actuator, while a magnitude of the pressure differential across the pumping mechanism may determine an output torque. The rotary actuator(s) may be fixed- or variable-displacement type motors, as desired.

Machine 10 may include a hydraulic system 72 having a plurality of fluid components that cooperate with the linear and rotary actuators described above to move work tool 14 (referring to FIG. 1) and machine 10. In particular, hydraulic system 72 may include, among other things, a circuit 74 fluidly connecting pump 80 with the different actuators of machine 10, an over-pressure protection arrangement (OPPA) 76 associated with pump 80, and a load-holding valve arrangement (LHVA) 78 associated with hydraulic cylinders 26. It is contemplated that hydraulic system 72 may include additional and/or different circuits or components, if desired, such as a charge circuit, an energy storage circuit, switching valves, makeup valves, relief valves, and other circuits or valves known in the art.

Circuit 74 may include multiple different passages that fluidly connect pump 80 to hydraulic cylinders 26 and, in some configurations, to the other actuators of machine 10 in a parallel, closed-loop manner. For example, pump 80 may be connected to hydraulic cylinders 26 via a first pump passage 82, a second pump passage 84, a head-end passage 86, and a rod-end passage 88.

Pump 80 may have variable displacement and be controlled to draw fluid from its associated actuators and discharge the fluid at a specified elevated pressure back to the actuators in two different directions (i.e., pump 80 may be an over-center pump). Pump 80 may include a stroke-adjusting mechanism, for example a swashplate, a position of which is hydro-mechanically or electro-hydraulically adjusted based on, among other things, a desired speed of the actuators to thereby vary an output (e.g., a discharge rate) of pump 80. The displacement of pump 80 may be adjusted from a zero displacement position at which substantially no fluid is discharged from pump 80, to a maximum displacement position in a first direction at which fluid is discharged from pump 80 at a maximum rate into first pump passage 82. Likewise, the displacement of pump 80 may be adjusted from the zero displacement position to a maximum displacement position in a second direction at which fluid is discharged from pump 80 at a maximum rate into second pump passage 84. Pump 80 may be drivably connected to power source 18 of machine 10 by, for example, a countershaft, a belt, or in another suitable manner. Alternatively, pump 80 may be indirectly connected to power source 18 via a torque converter, a gear box, an electrical circuit, or in any other manner known in the art. It is contemplated that pump 80 may be connected to power source 18 in tandem (e.g., via the same shaft) or in parallel (e.g., via a gear train) with other pumps (not shown) of machine 10, as desired.

Pump 80 may also be selectively operated as a motor. More specifically, when an associated actuator is operating in an overrunning condition (i.e., a condition where the actuator is driven by a load, the fluid discharged from the actuator may have a pressure elevated above an output pressure of pump 80. In this situation, the elevated pressure of the actuator fluid directed back through pump 80 may function to drive pump 80 to rotate with or without assistance from power source 18. Under some circumstances, pump 80 may even be capable of imparting energy to power source 18, thereby improving an efficiency and/or capacity of power source 18.

OPPA 76 may include components that cooperate to protect pump 80 from damaging pressure spikes that can move through circuit 74 in reverse direction relative to an output direction of pump 80. Specifically, OPPA 76 may include, among other things, first and second check valves 87, 89, first and second bypass lines 90, 92, and a control valve 94.

First check valve 87 may be disposed within first pump passage 82 and configured to allow fluid flow in only one direction away from pump 80 and toward first chambers 52 of hydraulic cylinders 26 (i.e., first check valve 87 may inhibit reverse flow from hydraulic cylinders 26 back into pump 80 via first pump passage 82). Similarly, second check valve 89 may be disposed within second pump passage 84 and configured to allow fluid flow in only one direction away from pump 80 and toward second chambers 54 of hydraulic cylinders 26 (i.e., second check valve 89 may inhibit reverse flow from hydraulic cylinders 26 back into pump 80 via second pump passage 84).

First bypass line 90 may connect at one end to first pump passage 82 at a location between hydraulic cylinders 26 and first check valve 87, and at a second end to first pump passage 82 at a location between first check valve 87 and pump 80. In other words, first bypass line 90 may allow return fluid within first pump passage 82 to bypass first check valve 87 and enter pump 80. Second bypass line 92 may connect at one end to second pump passage 84 at a location between hydraulic cylinders 26 and second check valve 89, and at a second end to second pump passage 84 at a location between second check valve 89 and pump 80. In other words, second bypass line 92 may allow return fluid within second pump passage 84 to bypass second check valve 89 and enter pump 80.

Control valve 94 may be configured to regulate fluid flow through first and second bypass lines 90, 92. In particular, control valve 94 may be a solenoid-operated, spring-biased valve configured to move between a first discrete position at which fluid may freely flow through first bypass line 90 but is substantially blocked in second bypass line 92, and a second discrete position (shown in FIG. 2) at which fluid may freely flow through second bypass line 92 but is substantially blocked in first bypass line 90. It is contemplated, however, that control valve 94 could alternatively be a variable-position valve instead of discrete position valve, or embody a hydro-mechanical valve instead of a solenoid-operated valve, if desired. For example, control valve 94 could be pilot operated via a signal from a swashplate control valve (not shown). Control valve 94, as a variable position valve, could be useful in some situations for controlling a speed of hydraulic cylinders 26, a load on pump 80, and/or for facilitating regeneration wherein some fluid returning from hydraulic cylinders 26 may be passed directly back to hydraulic cylinders 26 via control valve 94, without the fluid first passing through pump 80.

(LHVA) 78 may be configured to selectively lock hydraulic cylinders 26 in place when an operator ceases to request movement of hydraulic cylinders 26. FIG. 2 illustrates (LHVA) 78 as having two different types of load-holding valves, including a hydro-mechanical valve 96 and an electro-mechanical valve 98. It should be noted, however, that the two different valves are shown only to illustrate that different types of load-holding valves could be utilized in conjunction with hydraulic cylinders 26 and two substantially identical load-holding valves 96 or 98 would normally be utilized in most applications.

Load-holding valve 96 may be a poppet-type valve having a poppet element 100 moveable within a bore 102 between a flow-blocking position (shown in FIG. 2) at which a nose portion of poppet element 100 engages a seat within bore 102, and a flow-passing position at which the nose portion is away from the seat. Poppet element 100 may be spring-biased toward the flow-blocking position and moved toward the flow-passing position when a pressure of fluid acting on the nose portion exceeds a combined force of fluid acting on an opposing base portion and the spring-bias. Second pump passage 84 and rod-end passage 88 may be in fluid communication via bore 102 at the nose portion of valve element 100 such that movement of valve element 100 between the flow-blocking and flow-passing positions controls fluid flow between passages 84 and 88. A restricted passage 104 may connect rod-end passage 88 with the base portion of valve element 100 to help regulate motion of valve element 100. A bypass passage 106 having a check element 108 may allow fluid to be pushed by the base portion of valve element 100 out of bore 102 and into rod-end passage 88 during initial retracting movements of hydraulic cylinders 26 (i.e., after hydraulic cylinders 26 have been locked by load-holding valve 96).

In some situations, it may be necessary to drain fluid from the base portion of poppet element 100 to allow poppet 100 to move away from the seat within bore 102. For this purpose, a two-position (e.g., flow-passing, flow-blocking) valve 109 may be disposed between the base portion and a low-pressure tank 112 to control selective draining of the base portion.

Load-holding valve 98 may also be a poppet-type valve having poppet element 100 moveable within bore 102 between the flow-blocking and the flow-passing positions. First pump passage 82 and head-end passage 86 may be in fluid communication via bore 102 of load-holding valve 98 at the nose portion of valve element 100 such that movement of valve element 100 controls fluid flow between passages 82 and 86. In contrast to load-holding valve 96, however, load-holding valve 98 may include a control passage 110 in place of restricted and bypass passages 104, 106. Control passage 110 may be selectively fluidly communicated with fluid from head-end passage 86 or with low-pressure tank 112 via a solenoid valve 114. When control passage 110 is communicated with the fluid from head-end passage 86, valve element 100 of load-holding valve 98 may be urged toward its flow-blocking position, thereby hydraulically locking hydraulic cylinders 26. When control passage 110 is fluidly communicated with low-pressure tank 112, valve element 100 may be allowed to move toward its flow-passing position, thereby allowing free movement of hydraulic cylinders 26.

During operation of machine 10, the operator may utilize interface device 46 to provide a signal that identifies a desired movement of the various linear and/or rotary actuators to a controller 140. Based upon one or more signals, including the signal from interface device 46 and, for example, signals from various pressure sensors (not shown) and/or position sensors (not shown) located throughout hydraulic system 72, controller 140 may command movement of the different valves and/or displacement changes of the different pumps and motors to advance a particular one or more of the linear and/or rotary actuators to a desired position in a desired manner (i.e., at a desired speed and/or with a desired force).

Controller 140 may embody a single microprocessor or multiple microprocessors that include components for controlling operations of hydraulic system 72 based on input from an operator of machine 10 and based on sensed or other known operational parameters. Numerous commercially available microprocessors can be configured to perform the functions of controller 140. It should be appreciated that controller 140 could readily be embodied in a general machine microprocessor capable of controlling numerous machine functions. Controller 140 may include a memory, a secondary storage device, a processor, and any other components for running an application. Various other circuits may be associated with controller 140 such as power supply circuitry, signal conditioning circuitry, solenoid driver circuitry, and other types of circuitry.

Industrial Applicability

The disclosed hydraulic system may be applicable to any machine where improved hydraulic efficiency and pump protection are desired. The disclosed hydraulic system may provide for improved efficiency through the use of closed-loop technology. The disclosed hydraulic system may provide for pump protection through the use of OPPA 76. Operation of hydraulic system 72 will now be described.

During operation of machine 10, an operator located within station 20 may command a particular motion of work tool 14 in a desired direction and at a desired velocity by way of interface device 46. One or more corresponding signals generated by interface device 46 may be provided to controller 140 indicative of the desired motion, along with machine performance information, for example sensor data such a pressure data, position data, speed data, pump or motor displacement data, and other data known in the art.

In response to the signals from interface device 46 and based on the machine performance information, controller 140 may generate control signals directed to the stroke adjusting mechanism of pump 80 and to valve 94. For example, to drive hydraulic cylinders 26 at an increasing speed in an extending direction, controller 140 may generate a control signal that causes pump 80 of circuit 74 to increase its displacement in the first direction that results in pressurized fluid discharge into second pump passage 84, rod-end passage 88, and first chambers 54 at a greater rate, while simultaneously moving control valve 94 to the first position. When control valve 94 is in the first position, return fluid from first chambers 52 of hydraulic cylinders 26 and/or from the other linear or rotary actuators of hydraulic system 72 may flow through head-end passage 86, first pump passage 82, first bypass line 90, and control valve 94 back into pump 80.

Similarly, to drive hydraulic cylinders 26 at an increasing speed in a retracting direction, controller 140 may generate a control signal that causes pump 80 of circuit 74 to increase its displacement in the second direction that results in pressurized fluid discharge into first pump passage 82, head-end passage 86, and first chambers 52 at a greater rate, while simultaneously moving control valve 94 to the second position (shown in FIG. 2). When control valve 94 is in the second position, return fluid from first chambers 54 of hydraulic cylinders 26 and/or from the other linear or rotary actuators of hydraulic system 72 may flow through rod-end passage 88, second pump passage 84, second bypass line 92, and control valve 94 back into pump 80.

OPPA 76 may help to protect pump 80 from a shock load traveling in reverse direction through first and second pump passages 82, 84. That is, during operation of hydraulic cylinder 26, most commonly when another of the linear or rotary actuators (i.e., hydraulic cylinder 32, hydraulic cylinder 34, left travel motor 42L, right travel motor 42R, or swing motor 43) is simultaneously being actuated with hydraulic cylinders 26, it may be possible for a pressure wave to be generated that travels in reverse direction through the one of first and second pump passages 82, 84 currently functioning as the high-pressure supply passage back to pump 80. If left unchecked, this pressure wave could damage pump 80. Accordingly, check valves 87, 89 may be situated to inhibit the reverse-traveling pressure wave from passing through first or second pump passages 82, 84 and into pump 80 in the reverse direction. With check valves 87, 89 in place, however, pump 80 may have difficulty drawing in fluid to pressurize for hydraulic cylinders 26. To remedy this situation, bypass lines 90, 92, together with control valve 94, may fluidly connect pump 80 to the correct low-pressure feed from first or second pump passages 82, 84.

When an operator stops requesting movement of hydraulic cylinders 26 (e.g., when the operator releases interface device 46), controller 140 may cause the displacement of pump 80 to move to the zero displacement position (i.e., to destroke). When pump 80 is destroked, the pressure within first and second passages 82, 84 may be reduced, while the pressure within head- and/or rod-end passages 86, 88 may still be high. In this situation, pressure may naturally build at the poppet base portion of load-holding valve 96, causing valve element 100 to move to its flow-blocking position. In the embodiment of hydraulic system 72 that utilizes load-holding valve 98, the pressure at the poppet base portion may be controlled to build via solenoid valve 114 when pump 80 is destroked, similarly causing the corresponding valve element 100 to move to its flow-blocking position. When valve elements 100 are in their flow-blocking positions, hydraulic cylinders 26 may be hydraulically locked from substantial further movement. Operation may be similar when machine 10 is turned off and/or the operator activates a hydraulic lock-out switch (not shown).

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system, comprising:

a pump having variable displacement and over-center functionality;

an actuator;

first and second passages extending between the pump and the actuator to create a closed-loop circuit;

a first check valve disposed within the first passage to allow fluid flow only from the pump to the actuator;

a second check valve disposed within the second passage to allow fluid flow only from the pump to the actuator;

a first bypass line connecting the first passage at a location between the actuator and the first check valve to the first passage at a location between the first check valve and the pump;

a second bypass line connecting the second passage at a location between the actuator and the second check valve to the second passage at a location between the second check valve and the pump; and a valve configured to control fluid flow through the first and second bypass lines.

2. The hydraulic system of claim 1, wherein the valve is a two-position, four-way valve.

3. The hydraulic system of claim 2, wherein the valve is solenoid operated to move from a first position to a second position.

4. The hydraulic system of claim 3, wherein the valve is spring-biased toward the second position.

5. The hydraulic system of claim 2, wherein, when the valve is in a first position, fluid is allowed to flow through the first bypass line and fluid flow through the second bypass line is blocked.

6. The hydraulic system of claim 5, wherein, when the valve is in a second position, fluid flow through the first bypass line is blocked and fluid is allowed to flow through the second bypass line.

7. The hydraulic system of claim 1, further including a first load-holding valve associated with the first passage and disposed between the actuator and the first bypass line.

8. The hydraulic system of claim 7, further including a second load-holding valve substantially identical to the first load-holding valve, the second load-holding valve being associated with the second passage and disposed between the actuator and the second bypass line.

9. The hydraulic system of claim 7, wherein the first load-holding valve is a hydro-mechanical valve.

10. The hydraulic system of claim 7, wherein the first load-holding valve is an electro-mechanical valve.

11. The hydraulic system of claim 1, wherein:

the actuator is a first actuator; and the hydraulic system further includes a second actuator fluidly connected to the pump in parallel with the first actuator via the first and second passages.

12. A hydraulic system, comprising:

a pump having variable displacement over-center functionality;

a first actuator;

first and second passages extending between the pump and the actuator to create a closed-loop circuit;

a first check valve disposed within the first passage to allow fluid flow only from the pump to the actuator;

a second check valve disposed within the second passage to allow fluid flow only from the pump to the actuator;

a first bypass line connecting the first passage at a location between the actuator and the first check valve to the first passage at a location between the first check valve and the pump;

a second bypass line connecting the second passage at a location between the actuator and the second check valve to the second passage at a location between the second check valve and the pump;

a two-position, four-way valve that is solenoid operated to move from a first position at which fluid is allowed to flow through the first bypass line and fluid flow through the second bypass line is blocked, to a second position at which fluid flow through the first bypass line is blocked and fluid is allowed to flow through the second bypass line;

a first load-holding valve associated with the first passage and disposed between the actuator and the first bypass line;

a second load-holding valve substantially identical to the first load-holding valve, the second load-holding valve being associated with the second passage and disposed between the actuator and the second bypass line; and a second actuator fluidly connected to the pump in parallel with the first actuator via the first and second passages.

13. A method of operating a hydraulic system, comprising:

pressurizing fluid with a pump;

directing the fluid to an actuator in two different directions via a closed-loop circuit formed by a first passage and a second passage;

preventing return flow from the actuator to the pump via a first check valve in the first passage;

preventing return flow from the actuator to the pump via a check valve in the second passage; and selectively allowing return flow from the actuator to bypass the first or second check valves.

14. The method of claim 13, wherein selectively allowing return flow from the actuator to bypass the first or second check valves includes controlling a solenoid valve to move between first and second positions.

15. The method of claim 14, wherein, when the solenoid valve is in the first position, return fluid is allowed to bypass only the first check valve.

16. The method of claim 15, wherein, when the solenoid valve is in the second position, return fluid is allowed to bypass only the second check valve.

17. The method of claim 13, further including hydraulically locking the actuator from movement when a pressure of the first or second passages is less than a pressure of the actuator.

18. The method of claim 17, wherein hydraulically locking the actuator includes blocking fluid flow into and out of the actuator via the first and second passages.

19. The method of claim 13, wherein:

the actuator is a first actuator; and the method further includes directing fluid pressurized by the pump to a second actuator in parallel with the first actuator via the first and second passages.

20. The method of claim 13, further including selectively adjusting a displacement of the pump to vary a speed of the actuator.

* * * * *

UNITED STATES PATENT AND TRADEMARK OFFICE

CERTIFICATE OF CORRECTION

PATENT NO. : 8,966,891 B2
APPLICATION NO. : 13/250171
DATED : March 3, 2015
INVENTOR(S) : Patrick Opdenbosch It is certified that error appears in the above-identified patent and that said Letters Patent is hereby corrected as shown below:

In the Specification:

Column 7, line 35, delete “Industrial Applicability” and insert -- INDUSTRIAL APPLICABILITY --.

Signed and Sealed this
Nineteenth Day of January, 2016

Michelle K. Lee
*Director of the United States Patent and Trademark Office*